United States Patent
Ressencourt (10) Patent No.: US 12,384,322 B2
(45) Date of Patent: Aug. 12, 2025

(54) AIRBAG WITH SACRIFICIAL ELASTOMER LINE

(71) Applicant: Atieva, Inc., Newark, CA (US)

(72) Inventor: Anthony Serge Marcel Ressencourt, Fremont, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/347,917

(22) Filed: Jul. 6, 2023

(65) Prior Publication Data

US 2024/0042958 A1  Feb. 8, 2024

Related U.S. Application Data

(60) Provisional application No. 63/370,336, filed on Aug. 3, 2022.

(51) Int. Cl.
  *B60R 21/235* (2006.01)
  *B29D 22/02* (2006.01)

(52) U.S. Cl.
  CPC .......... *B60R 21/235* (2013.01); *B29D 22/02* (2013.01); *B60R 2021/23509* (2013.01); *B60R 2021/23519* (2013.01); *B60R 2021/23538* (2013.01); *B60R 2021/23561* (2013.01)

(58) Field of Classification Search
  CPC .............. B60R 2021/2358; B60R 2021/23595
  See application file for complete search history.

(56) References Cited

U.S. PATENT DOCUMENTS

| | | | |
|---|---|---|---|
| 5,114,180 A * | 5/1992 | Kami | B60R 21/235 280/739 |
| 5,399,402 A | 3/1995 | Inoue et al. | |
| 6,569,788 B1 | 5/2003 | Hurst et al. | |
| 6,886,857 B1 * | 5/2005 | Mishina | B60R 21/2342 280/739 |
| 8,376,401 B2 * | 2/2013 | Wipasuramonton | B60R 21/235 280/743.1 |
| 11,065,149 B2 | 7/2021 | Benyaminpour et al. | |
| 2002/0020992 A1 * | 2/2002 | Kanuma | B60R 21/235 280/730.2 |
| 2006/0163849 A1 * | 7/2006 | Keshavaraj | B60R 21/239 280/730.2 |
| 2009/0267333 A1 | 10/2009 | Pittiglio et al. | |

(Continued)

FOREIGN PATENT DOCUMENTS

DE  102017002971 A1 *  11/2017
EP  0962363 A1  12/1999

(Continued)

OTHER PUBLICATIONS

International Search Report and Written Opinion for PCT Application No. PCT/US2023/069686, mailed on Oct. 20, 2023, 15 pages.

*Primary Examiner* — Nicole T Verley
(74) *Attorney, Agent, or Firm* — Brake Hughes Bellermann LLP (57) ABSTRACT

An airbag comprises: first and second fabric panels; a seam at a seam area of the first and second fabric panels, the seam joining the first and second fabric panels to each other; and a sacrificial elastomer line at a location inward of the seam area, the sacrificial elastomer line joining the first and second fabric panels to each other at the location.

21 Claims, 7 Drawing Sheets

(56) References Cited

U.S. PATENT DOCUMENTS

| | | | |
|---|---|---|---|
| 2010/0109305 A1* | 5/2010 | Miyata | B60R 21/235 |
| | | | 280/743.1 |
| 2010/0244415 A1* | 9/2010 | Wipasuramonton | |
| | | | B60R 21/232 |
| | | | 280/730.2 |
| 2011/0012331 A1* | 1/2011 | Kim | B60R 21/232 |
| | | | 280/730.2 |
| 2011/0076479 A1 | 3/2011 | Danielson et al. | |
| 2011/0181031 A1* | 7/2011 | Wipasuramonton | |
| | | | B60R 21/235 |
| | | | 280/743.1 |
| 2013/0225024 A1 | 8/2013 | Mizushima et al. | |
| 2013/0292930 A1* | 11/2013 | Wipasuramonton | |
| | | | B60R 21/2342 |
| | | | 280/743.1 |

FOREIGN PATENT DOCUMENTS

| | | | | |
|---|---|---|---|---|
| EP | 1736378 A1 * | 12/2006 | | B32B 5/02 |
| JP | 2008542095 A * | 5/2006 | | |
| JP | 2013540649 A * | 10/2011 | | |
| WO | WO-0123183 A1 * | 4/2001 | | B29C 65/04 |
| WO | WO-2009146220 A1 * | 12/2009 | | B60R 21/232 |
| WO | WO-2015048705 A1 * | 4/2015 | | A47C 27/081 |
| WO | WO-2015048706 A1 * | 4/2015 | | A47C 27/081 |
| WO | WO-2017141857 A1 * | 8/2017 | | B60R 21/231 |

* cited by examiner

AIRBAG WITH SACRIFICIAL ELASTOMER LINE

CROSS-REFERENCE TO RELATED APPLICATION

This application claims benefit, under 35 U.S.C. § 119, of U.S. Provisional Patent Application No. 63/370,336, filed on Aug. 3, 2022, entitled "AIRBAG WITH SACRIFICIAL ELASTOMER LINE", the disclosure of which is incorporated by reference herein in its entirety.

TECHNICAL FIELD

This document relates to an airbag with a sacrificial elastomer line.

BACKGROUND

Different types of airbags used with vehicles must comply with the respective regulations or other standards that may be applicable to their particular use. The majority of airbag applications, including at least driver airbags, passenger airbags, and side airbags, are generally not required to hold their inflated pressure for a long time. For example, these types of airbags are accepted for use in vehicles also if they lose most of their pressure within a fraction of a second after inflation. In contrast to the above, so-called curtain airbags are typically installed in a roof rail of the vehicle and are configured to extend over at least part of a side window upon inflating. Curtain airbags may be required to remain inflated for a significantly longer time than mentioned above. For example, the curtain airbag may need to maintain significant pressure for at least about six seconds after inflation.

In order for a curtain airbag to maintain its pressure over a time that is on the order of multiple seconds, it can be designed as a cut, sewn and sealed type of airbag. The sealing is what ensures that the pressure is maintained over a period of time. Curtain airbags are sometimes instead made using a technique known as one-piece woven, in which the airbag is made of a single piece of fabric and there are no fabric seams to be sealed. The other types of airbags that only need to remain inflated for a fraction of a second, by contrast, have designs that can be referred to as a cut and sewn type of airbag. That is, this type of airbag does not have sealing applied to its seams.

SUMMARY

In a first aspect, an airbag comprises: first and second fabric panels; a seam at a seam area of the first and second fabric panels, the seam joining the first and second fabric panels to each other; and a sacrificial elastomer line at a location inward of the seam area, the sacrificial elastomer line joining the first and second fabric panels to each other at the location.

Implementations can include any or all of the following features. The airbag is a cut, sewn, and sealed airbag, the airbag further comprising a first elastomer line at the seam, the first elastomer line sealing the seam. A gap separates the sacrificial elastomer line from the first elastomer line. The first elastomer line is adjacent to the sacrificial elastomer line without a gap. The first and sacrificial elastomer lines have a common width. The first and sacrificial elastomer lines are made of silicone. The location of the sacrificial elastomer line is a stress area of the airbag. The stress area comprises a corner of the seam. A shape of the sacrificial elastomer line corresponds to at least a part of a shape of the corner of the seam. The sacrificial elastomer line extends along as much of a periphery of the first and second fabric panels as the seam does. The airbag further comprises a sacrificial seam at the sacrificial elastomer line. The seam is stronger than the sacrificial seam. The airbag is a cut and sewn airbag, and wherein the airbag does not have a seal at the seam.

In a second aspect, a method of manufacturing an airbag comprises: applying a sacrificial elastomer line at a location inward of a seam area at a periphery of first and second fabric panels; curing the sacrificial elastomer line, wherein the sacrificial elastomer line joins the first and second fabric panels to each other at the location; and forming a seam at the seam area, the seam joining the first and second fabric panels to each other.

Implementations can include any or all of the following features. The airbag is a cut, sewn, and sealed airbag, the method further comprising applying a first elastomer line at the seam area before forming the first seam, and curing also the first elastomer line, wherein the first elastomer line seals the seam. The method further comprises forming a sacrificial seam at the sacrificial elastomer line. Applying the first or sacrificial elastomer line comprises forming a gap between the first and sacrificial elastomer lines. Applying the first or sacrificial elastomer line comprises not forming any gap between the first and sacrificial elastomer lines. The location of the sacrificial elastomer line is a stress area of the airbag, wherein the stress area comprises a corner of the seam, and wherein applying the sacrificial elastomer line comprises shaping the sacrificial elastomer line to correspond to at least a part of a shape of the corner of the seam. Applying the sacrificial elastomer line comprises extending the sacrificial elastomer line along as much of a periphery of the first and second fabric panels as the seam does. The method further comprises forming a sacrificial seam at the sacrificial elastomer line.

BRIEF DESCRIPTION OF DRAWINGS

FIG. 3 shows a flowchart of an example of a method.
Like reference symbols in the various drawings indicate like elements.

DETAILED DESCRIPTION

This document describes examples of systems and techniques that provide an airbag having a sacrificial elastomer line. The sacrificial elastomer line can serve to delay the onset of pressure increase, during airbag inflation, for a finite amount of time. In some implementations, the sacrificial elastomer line can be placed in a stress area of the airbag. For example, adding a sacrificial elastomer line next to a stressed seam can absorb energy during cushion inflation, thereby reducing the stress on the main functional seam and/or the fabric at the seam area. A sacrificial elastomer line can be applied to a cut, sewn and sealed type of airbag and/or to a cut and sewn type of airbag.

Examples described herein refer to elastomer lines. As used herein, an elastomer line includes an elastomer material that has any shape. In some implementations, an elastomer line can include silicone. In some implementations, an elastomer line can include a urethane adhesive. An elastomer line can be applied to a fabric panel in any of multiple ways. In some implementations, the elastomer line is deposited on the fabric panel through a nozzle, or other applicator, coupled to a reservoir of elastomer material. The elastomer line can be deposited on a fabric panel in one or more discrete locations and/or in a process of continuous application.

Examples described herein refer to a top, bottom, front, or rear. These and similar expressions identify things or aspects in a relative way based on an express or arbitrary notion of perspective. That is, these terms are illustrative only, used for purposes of explanation, and do not necessarily indicate the only possible position, direction, and so on.

FIGS. 1A-1D show examples relating to an airbag 100. The airbag 100 can be used with one or more other examples described elsewhere herein. The airbag 100 includes a fabric panel 102 that is currently visible, and a fabric panel 104 that is currently obstructed, in the present view. For example, the fabric panel 102 can have substantially the same shape and size as the fabric panel 104 and can be positioned in full overlap with the fabric panel 104. The fabric panels 102 and 104 can be made from one or more fabric materials. In some implementations, the fabric panels 102 and 104 are made of a woven fabric material, wherein at least one side of each fabric panel is coated with an elastomer material (e.g., silicone) to avoid excessive gas leakage.

Figure 1A:
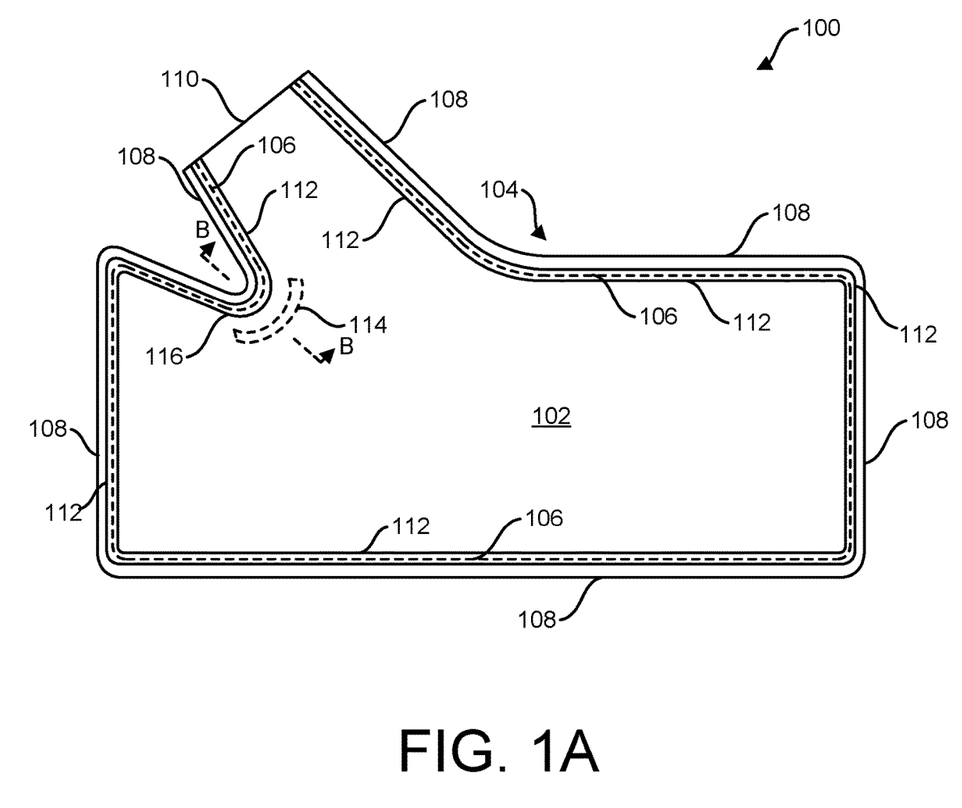
FIGS. 1A-1D show examples relating to an airbag.

A seam 106 is positioned at a seam area of the fabric panels 102-104 to join the fabric panels 102-104 to each other. For example, here the seam 106 is illustrated as a series of stitches that are positioned at substantially a fixed distance from a periphery 108 of the airbag 100. An opening 110 of the airbag 100 does not have the seam 106 so as to provide an inlet for inflating gas provided by an inflator (not shown).

The airbag 100 can be a cut, sewn and sealed type of airbag. In some implementations, the airbag can have an elastomer line 112 at the seam 106 that seals the seam 106. The elastomer line 112 can be a strip of elastomer material wider than the seam area where the seam 106 is located. The elastomer material can be applied between the fabric panels 102-104 before the seam 106 is generated. For clarity, the elastomer line 112 is not shown in phantom although the elastomer line 112 may currently be obscured by the fabric panel 102. After application the elastomer line 112 can be cured so that the elastomer line 112 closes the holes formed in making the seam 106.

The airbag 100 can include a sacrificial elastomer line 114. The sacrificial elastomer line 114 is positioned at a location inward of the seam area where the seam 106 is located. The sacrificial elastomer line 114 is positioned between the fabric panels 102-104 and joins the fabric panels 102-104 to each other. The sacrificial elastomer line 114 is shown in phantom.

The sacrificial elastomer line 114 can be placed in any of multiple locations of the airbag 100. In some implementations, the sacrificial elastomer line 114 is placed in a location that is a stress area of the airbag 100. The periphery 108 of the airbag 100 may have a corner 116 where the seam 106 makes a relatively sharp or narrow turn. For example, the stress area may be one or more locations at the seam 106 and/or at the elastomer line 112 where the inflation could rupture or otherwise create leakage in the airbag 100 and thereby prevent it from remaining inflated for at least a specified amount of time. The sacrificial elastomer line 114 can prevent or delay the pressure of the inflation from reaching the stress area. In some implementations, the sacrificial elastomer line 114 can have a shape that corresponds to at least part of the shape of the stress area. For example, here the sacrificial elastomer line 114 has a shape that corresponds to at least part of the shape of the corner 116.

The sacrificial elastomer line 114 can be placed at one or more positions of the airbag 100. In some implementations, the sacrificial elastomer line 114 extends along as much of the periphery 108 as the seam 106 does. For example, the sacrificial elastomer line 114 can extend around the periphery 108 except at the opening 110.

Figure 1B:
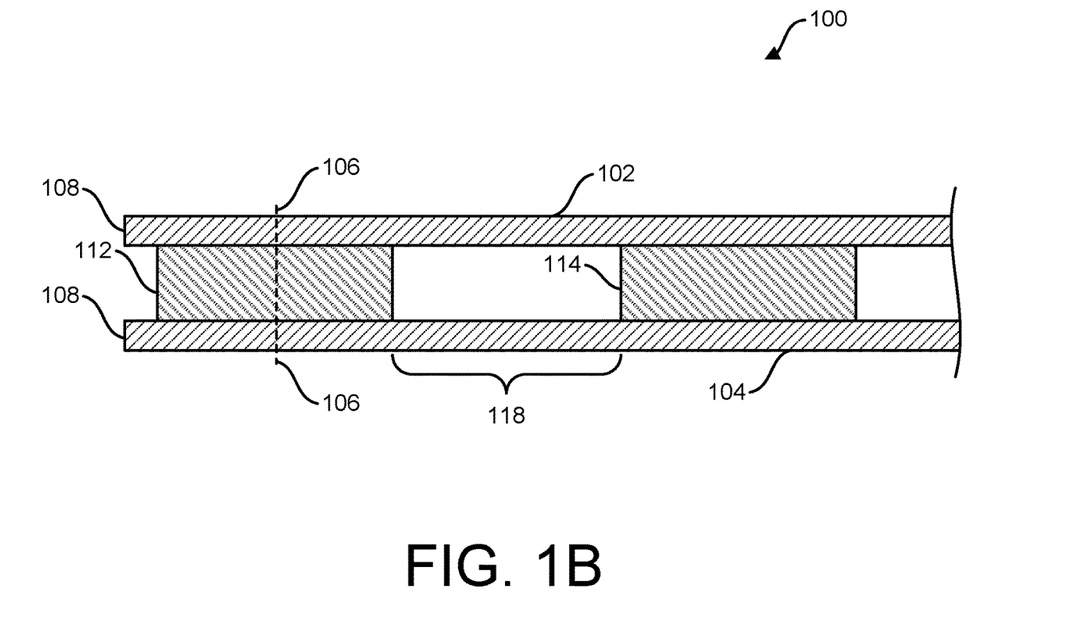

In FIG. 1B, a portion of the airbag 100 is shown in cross-section along a line B-B in FIG. 1A. The airbag 100 includes the fabric panels 102-104; the elastomer line 112 with the seam 106, positioned nearest the periphery 108; and the sacrificial elastomer line 114, at a location inward of the seam area. The sacrificial elastomer line 114 can be positioned so that a gap 118 separates the sacrificial elastomer line 114 from the elastomer line 112. For example, the gap 118 can provide a discontinuity in the path of the inflation force to damp the force along the seam 106. The gap 118 can be wider or narrower than the sacrificial elastomer line 114, and/or than the elastomer line 112, to name just some examples.

Figure 1C:
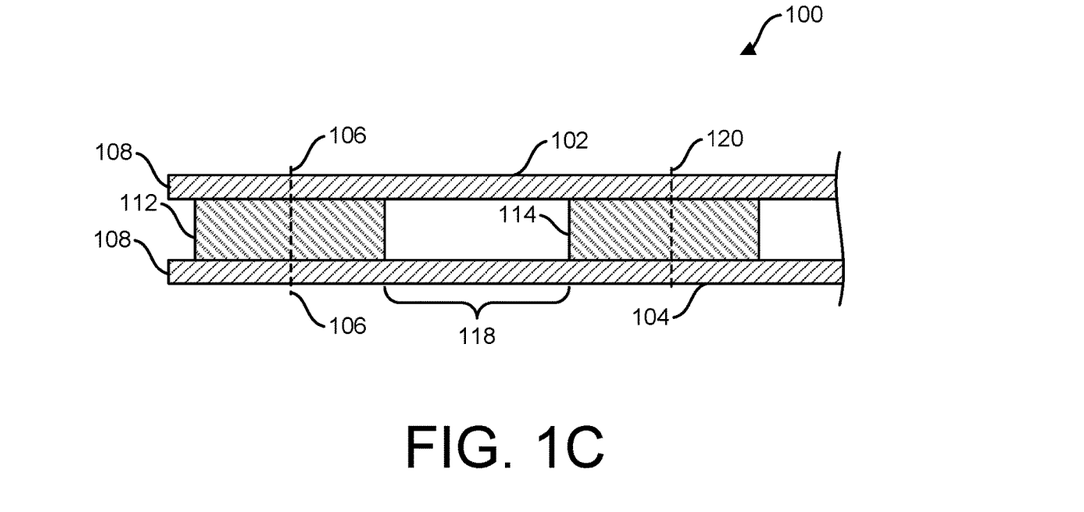

In FIG. 1C, some features are the same or similar as in FIG. 1B described above, and will not be mentioned explicitly. Here, a sacrificial seam 120 is applied to the fabric panels 102-104 at the sacrificial elastomer line 114. The sacrificial seam 120 can serve to further protect a stress area from inflation force. In some implementations, the seam 106 can be stronger than the sacrificial seam 120. For example, the sacrificial seam 120 can be made from thread having less tensile strength than the seam 106 and the threads of the fabric in the fabric panels 102-104.

Figure 1D:
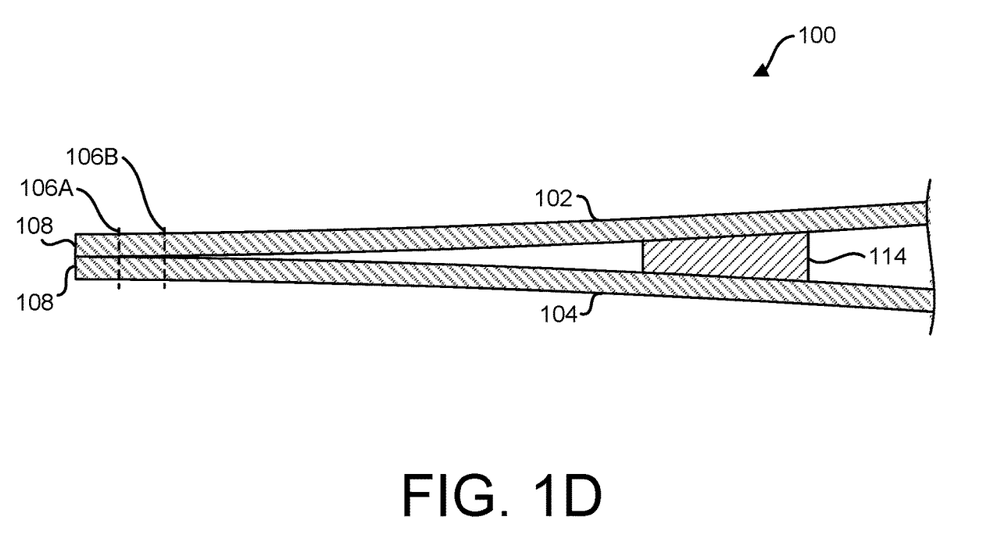

In FIG. 1D, some features are the same or similar as in FIG. 1B described above, and will not be mentioned explicitly. However, the airbag 100 is here a cut and sewn type of airbag. Near the periphery 108, the fabric panels 102-104 are joined to each other by seams 106A-106B that are not sealed. That is, the elastomer line 112 (e.g., FIG. 1B) is not used. The sacrificial elastomer line 114 is positioned between the fabric panels 102-104 at a location inward of the seam area.

Figure 1E:
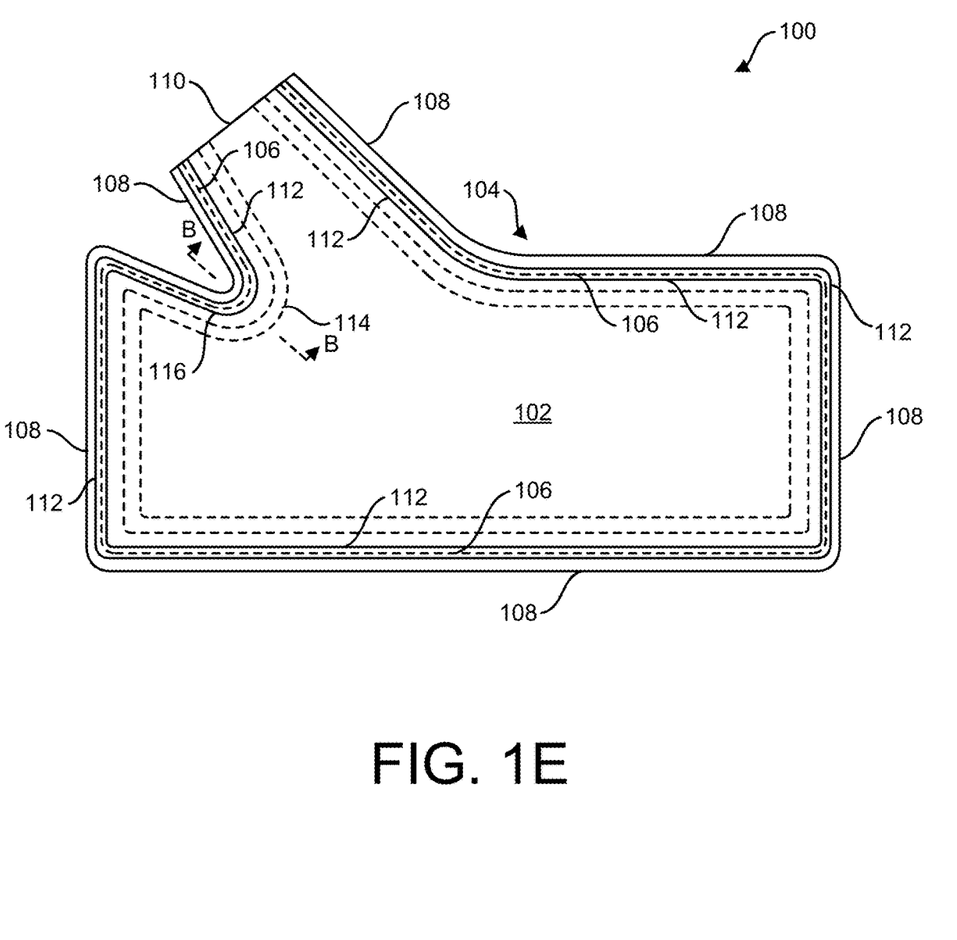
FIG. 1E shows that the sacrificial elastomer line extends along as much of a periphery of the first and second fabric panels as the seam does.

FIG. 1E shows that the sacrificial elastomer line 114 extends along as much of a periphery of the fabric panels 102-104 as the seam 106 does.

Figure 1F:
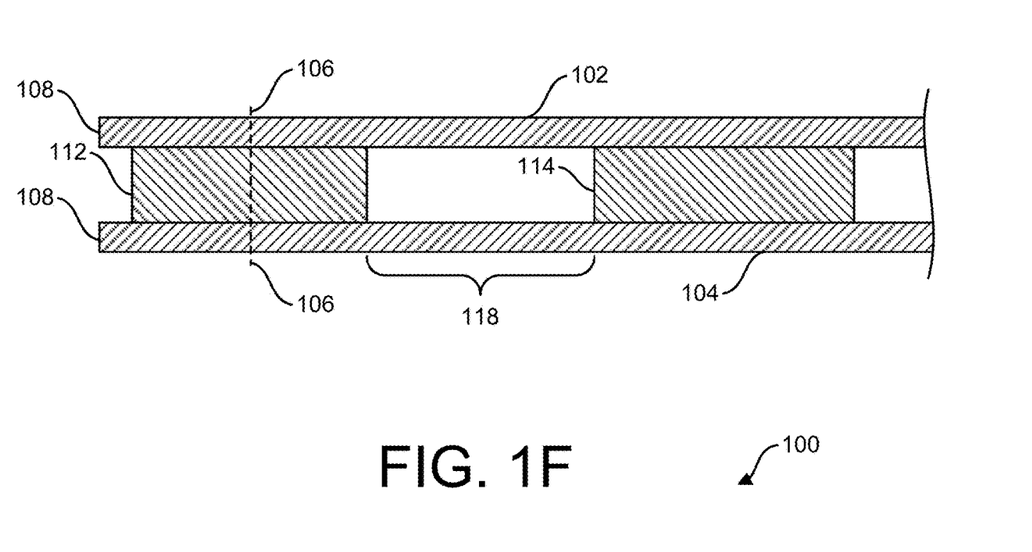
FIG. 1F shows that a width of the sacrificial elastomer line is greater than a width of the first elastomer line.

FIG. 1F shows that a width of the sacrificial elastomer line 114 is greater than a width of the elastomer line 112.

Figure 1G:
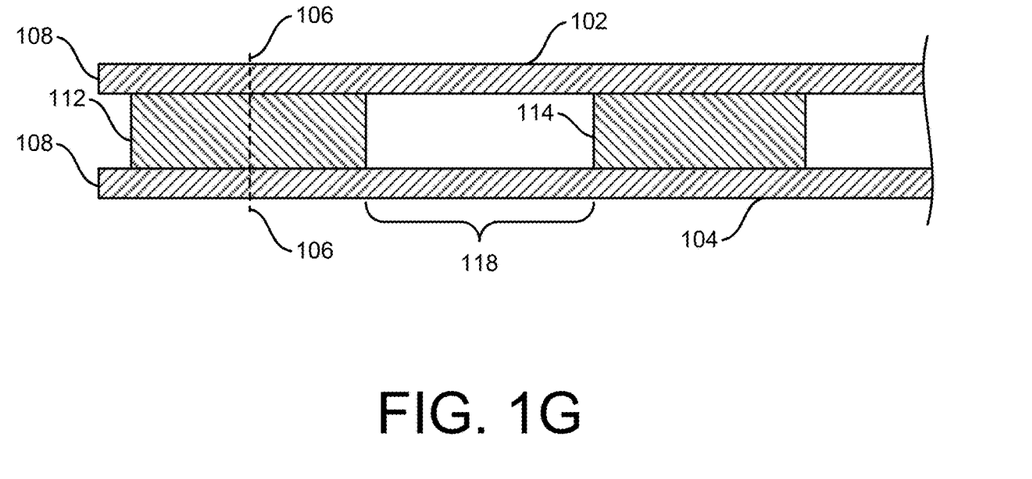
FIG. 1G shows that a width of the sacrificial elastomer line is smaller than a width of the first elastomer line.

FIG. 1G shows that a width of the sacrificial elastomer line 114 is smaller than a width of the first elastomer line 112.

Figure 2:
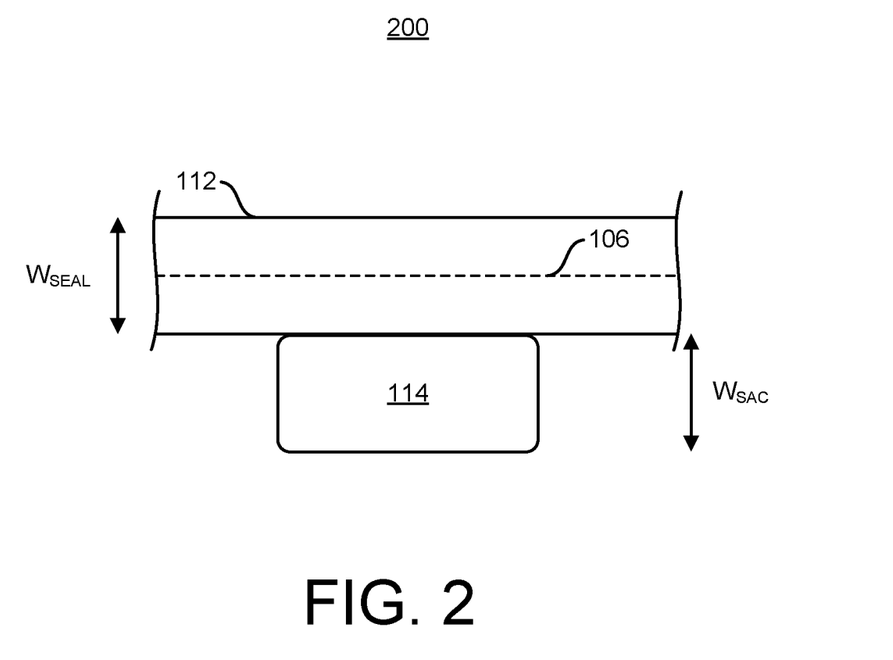
FIG. 2 shows an example of the elastomer sacrificial line of FIG. 1A.

FIG. 2 shows an example of the sacrificial elastomer line 114 of FIG. 1A. The sacrificial elastomer line 114 is here applied to at least one fabric panel 200 (e.g., either or both of the fabric panels 102-104 in FIGS. 1A-1C, here schematically shown). Respective portions of the seam 106 and of the elastomer line 112 are also shown. The elastomer line 112 has a width $W_{SEAL}$. For example, the elastomer line 112 is applied to the fabric panel 200 by dispensing the elastomer material through a nozzle (or other applicator) having a width substantially equal to $W_{SEAL}$. The sacrificial elastomer line 114 has a width $W_{SAC}$. The width $W_{SAC}$ can have any of multiple relationships with the width $W_{SEAL}$. The width $W_{SAC}$ can be greater than, smaller than, or have substantially a common width with, the width $W_{SEAL}$. Here, the width $W_{SAC}$ is substantially equal to the width $W_{SEAL}$. For example, the sacrificial elastomer line 114 and the elastomer line 112 can be dispensed using the same tool (e.g., the same nozzle/dispenser) and therefore have about the same width.

The sacrificial elastomer line 114 can be positioned at any distance from the elastomer line 112, including that there may be substantially no distance between them. Here, the sacrificial elastomer line 114 is positioned adjacent to (e.g., abuts) the elastomer line 112. As such, the sacrificial elastomer line 114 can be adjacent to the elastomer line 112 without a gap (e.g., without the gap 118 in FIG. 1B).

Figure 3:
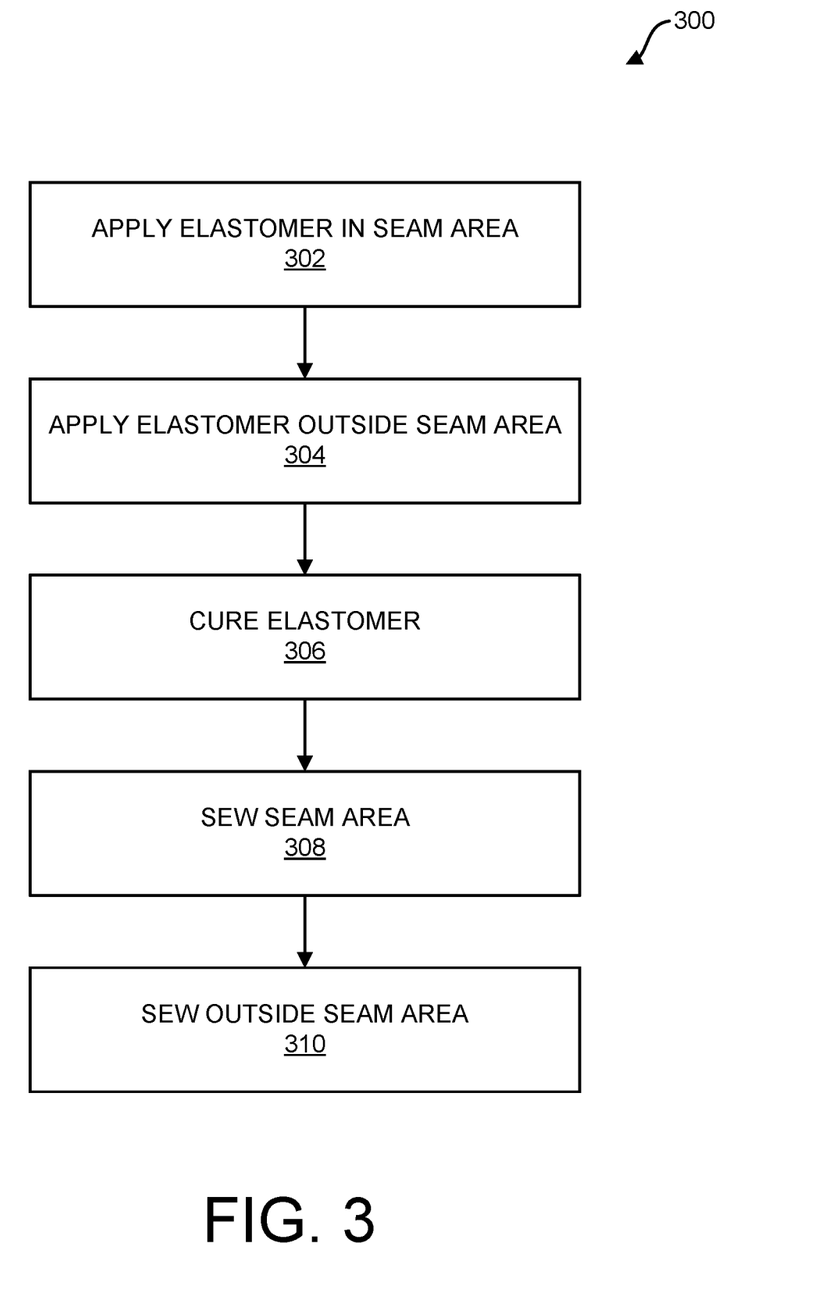

FIG. 3 shows a flowchart of an example of a method 300. The method 300 can be used with one or more other examples described elsewhere herein. More or fewer operations than shown can be performed. Two or more operations can be performed in a different order unless otherwise indicated.

In operation 302, a first elastomer line (e.g., the elastomer line 112 in FIG. 1A) can be applied at a seam area at a periphery of first and second fabric panels (e.g., the fabric panels 102 and 104 in FIG. 1A). In some implementations, the first elastomer line is applied before forming the seam 106 in FIG. 1A. This operation can be included when a cut, sewn and sealed type of airbag is being manufactured. By contrast, if a cut and sewn type of airbag is being manufactured, this operation can be omitted.

In operation 304, a sacrificial elastomer line (e.g., the sacrificial elastomer line 114 in FIG. 1A or FIG. 2) can be applied outside the seam area of the first and second fabric panels. The sacrificial elastomer line can be applied at a location inward of the seam area.

In operation 306, the elastomer material(s) can be cured. For example, if both the first and sacrificial elastomer lines have been applied, the first and sacrificial elastomer lines can be cured. If so, the first elastomer line seals the seam, and the sacrificial elastomer line joins the first and second fabric panels to each other. As another example, if only one or more sacrificial elastomer lines have been applied and the seam is not being sealed, the one or more sacrificial elastomer lines can be cured so that the sacrificial elastomer line joins the first and second fabric panels to each other.

In operation 308, the seam area can be sewn by forming a seam at the seam area. Any technique of forming a seam using thread can be used. For example, the seam 106 in FIG. 1A can be formed.

In operation 310, a sacrificial seam can be formed outside the seam area. In some implementations, the sacrificial seam 120 in FIG. 1B can be formed at the sacrificial elastomer line 114. For example, the sacrificial seam can be designed to rupture, in response to airbag inflation, so as to prevent or reduce stress at the seam area.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An airbag comprising:
   first and second fabric panels;
   a seam at a seam area of the first and second fabric panels, the seam joining the first and second fabric panels to each other, the seam including first stitches formed by a first thread; and
   a sacrificial elastomer line at a location inward of the seam area, the sacrificial elastomer line joining the first and second fabric panels to each other at the location.

2. The airbag of claim 1, wherein the airbag is a cut, sewn, and sealed airbag, the airbag further comprising a first elastomer line at the seam, the first elastomer line sealing the seam.

3. The airbag of claim 2, wherein a gap separates the sacrificial elastomer line from the first elastomer line.

4. The airbag of claim 2, wherein the first elastomer line is adjacent to the sacrificial elastomer line without a gap.

5. The airbag of claim 2, wherein the first elastomer line and the sacrificial elastomer line have a common width.

6. The airbag of claim 2, wherein the first elastomer line and the sacrificial elastomer line are made of silicone.

7. The airbag of claim 2, wherein the first elastomer line is positioned between the first and second fabric panels.

8. The airbag of claim 2, wherein a width of the sacrificial elastomer line is greater than a width of the first elastomer line.

9. The airbag of claim 2, wherein a width of the sacrificial elastomer line is smaller than a width of the first elastomer line.

10. The airbag of claim 1, wherein the sacrificial elastomer line extends along as much of a periphery of the first and second fabric panels as the seam does.

11. The airbag of claim 1, further comprising a sacrificial seam at the sacrificial elastomer line, the sacrificial seam including second stitches formed by a second thread.

12. The airbag of claim 11, wherein a material of the first and second fabric panels, and the first stitches of the seam, are stronger than the second stitches of the sacrificial seam.

13. The airbag of claim 1, wherein the airbag is a cut and sewn airbag, and wherein the airbag does not have a seal at the seam.

14. The airbag of claim 13, wherein the seam is a first seam, the airbag further comprising a second seam at the seam area, the second seam being adjacent the first seam, wherein the first and second seams are not sealed.

15. The airbag of claim 1, wherein the location of the sacrificial elastomer line is a stress area of the airbag.

16. The airbag of claim 1, wherein the sacrificial elastomer line does not extend along as much of a periphery of the first and second fabric panels as the seam does.

17. The airbag of claim 16, wherein the sacrificial elastomer line extends along only a corner of the seam.

18. The airbag of claim 17, wherein a shape of the sacrificial elastomer line corresponds to at least a part of a shape of the corner of the seam.

19. The airbag of claim 1, wherein the sacrificial elastomer line comprises at least one of silicone or a urethane adhesive material.

20. The airbag of claim 1, wherein at least one side of the first fabric panel is coated with a first elastomer material.

21. The airbag of claim 20, wherein at least one side of the second fabric panel is coated with a second elastomer material.

* * * * *